(12) United States Patent
Cord (10) Patent No.: US 11,608,025 B2
(45) Date of Patent: Mar. 21, 2023

(54) PROTECTION SYSTEM FOR PERSONS AND GOODS COMPRISING AN INFLATABLE STRUCTURE WITH LONG DURATION OF ACTION

(71) Applicant: Paul Philippe Cord, Paris (FR)

(72) Inventor: Paul Philippe Cord, Paris (FR)

(*) Notice: Subject to any disclaimer, the term of this patent is extended or adjusted under 35 U.S.C. 154(b) by 127 days.

(21) Appl. No.: 16/611,185

(22) PCT Filed: May 4, 2018

(86) PCT No.: PCT/FR2018/051138
§ 371 (c)(1),
(2) Date: Jun. 15, 2020

(87) PCT Pub. No.: WO2018/203020
PCT Pub. Date: Nov. 8, 2018

(65) Prior Publication Data
US 2020/0331424 A1    Oct. 22, 2020

(30) Foreign Application Priority Data
May 5, 2017  (FR) ..................................... 1754011

(51) Int. Cl.
*B60R 21/36* (2011.01)
*B60R 21/231* (2011.01)
(Continued)

(52) U.S. Cl.
CPC ........ *B60R 21/2644* (2013.01); *B60R 21/207* (2013.01); *B60R 21/231* (2013.01);
(Continued)

(58) Field of Classification Search
CPC ..... B60R 21/36; B60R 21/231; B60R 21/233; B60R 2021/23308; B60R 2021/23316; B60R 19/20; B60R 19/205
(Continued)

(56) References Cited

U.S. PATENT DOCUMENTS 3,822,076 A * 7/1974 Mercier ................ B60R 19/205
293/107
6,106,038 A * 8/2000 Dreher .................. B60R 19/205
293/107

(Continued)

FOREIGN PATENT DOCUMENTS

DE   10062560 A1 * 7/2001 ............. B60R 21/36
DE   10062560 A1    7/2001
(Continued)

OTHER PUBLICATIONS

International Search Report for International Application No. PCT/FR2018/051138 dated Aug. 28, 2018, 3 pages.
(Continued)

*Primary Examiner* — Keith J Frisby
(74) *Attorney, Agent, or Firm* — TraskBritt (57) ABSTRACT

A protection system comprises at least one inflatable safety structure, each associated with a gas generator that can be activated by an external command, wherein the external command comprises an electrical signal from an automated system that is responsible for the critical safety functions of a vehicle, corresponding to predictive information about an impact. The gas generator is configured to generate a gas over a time period such that the total inflation time of the inflatable structure is greater than 50 milliseconds. The inflatable structure may be waterproof.

13 Claims, 3 Drawing Sheets

(51) Int. Cl.
  *B60R 21/233* (2006.01)
  *B60R 21/207* (2006.01)
  *B60R 21/264* (2006.01)
  *B60R 21/00* (2006.01)
  *B60R 21/263* (2011.01)

(52) U.S. Cl.
  CPC ............ *B60R 21/233* (2013.01); *B60R 21/36* (2013.01); *B60R 21/23138* (2013.01); *B60R 2021/0004* (2013.01); *B60R 2021/23107* (2013.01); *B60R 2021/23146* (2013.01); *B60R 2021/23308* (2013.01); *B60R 2021/23316* (2013.01); *B60R 2021/2633* (2013.01); *B60R 2021/2648* (2013.01)

(58) Field of Classification Search
  USPC .................................................. 180/274, 271
  See application file for complete search history.

(56) References Cited

U.S. PATENT DOCUMENTS

| | | | |
|---|---|---|---|
| 6,116,644 A | 9/2000 | Viano et al. | |
| 7,967,098 B2 * | 6/2011 | Choi | B60R 21/36 180/274 |
| 8,764,062 B2 * | 7/2014 | Chung | B60R 19/205 280/770 |
| 8,985,652 B1 | 3/2015 | Switkes et al. | |
| 9,027,696 B2 * | 5/2015 | Park | B60R 21/36 180/274 |
| 10,029,638 B1 * | 7/2018 | Lombrozo | B60R 21/0134 |
| 10,870,402 B2 * | 12/2020 | Havlik | B60R 19/205 |
| 2005/0087998 A1 * | 4/2005 | Curry | B60R 21/2338 293/107 |
| 2005/0269805 A1 * | 12/2005 | Kalliske | B60R 21/36 280/730.1 |
| 2006/0169517 A1 * | 8/2006 | Mishra | B60R 21/013 180/274 |
| 2006/0175813 A1 | 8/2006 | Heudorfer et al. | |
| 2008/0147278 A1 | 6/2008 | Breed | |
| 2008/0243342 A1 * | 10/2008 | Breed | B60R 21/232 701/45 |

FOREIGN PATENT DOCUMENTS

| | | | |
|---|---|---|---|
| DE | 10119351 C1 | 7/2002 | |
| DE | 10356572 A1 * | 6/2005 | ............. B60R 21/36 |
| DE | 102006057655 A1 * | 6/2008 | ............. B60R 21/36 |
| EP | 2599669 B1 | 7/2015 | |
| EP | 3228505 B1 | 2/2019 | |
| WO | 01/89885 A1 | 11/2001 | |
| WO | 2003/053751 A1 | 7/2003 | |
| WO | 2004/016478 A1 | 2/2004 | |
| WO | 2010/103231 A1 | 9/2010 | |

OTHER PUBLICATIONS

International Written Opinion for International Application No. PCT/FR2018/051138 dated Aug. 28, 2018, 6 pages.

* cited by examiner

PROTECTION SYSTEM FOR PERSONS AND GOODS COMPRISING AN INFLATABLE STRUCTURE WITH LONG DURATION OF ACTION

CROSS-REFERENCE TO RELATED APPLICATIONS

This application is a national phase entry under 35 U.S.C. § 371 of International Patent Application PCT/FR2018/051138, filed May 4, 2018, designating the United States of America and published as International Patent Publication WO 2018/203020 A1 on Nov. 8, 2018, which claims the benefit under Article 8 of the Patent Cooperation Treaty to French Patent Application Serial No. 1754011, filed May 5, 2017.

TECHNICAL FIELD

The present disclosure relates to a protection system comprising at least one inflatable safety structure each associated with a gas generator that can be activated by an external control system.

The protection system according to the present disclosure is intended, in particular, but not exclusively, for the autonomous vehicle.

BACKGROUND

Protection systems typically include airbags associated with gas generators that operate their deployment upon an impact as well as seat belt pre-tensioners. However, the gas generators in current airbags and seat belt pre-tensioners have major disadvantages.

First, their activation is triggered by the shock itself. The detection time of the event and the activation of the protection systems is reduced to a few hundredths of a second. (1 to 2 hundredths of a second for detection and 1.5 to 4 hundredths of a second for activation of protection systems, i.e., a total of 0.06 seconds). This rapid implementation of airbags and pre-tensioners can create degraded performance in terms of protection if not injuries. Indeed, the rapid deployment of an airbag can be dangerous for a passenger when he or she occupies a position other than his or her normal position. This can cause serious injuries to people who are too close to the steering wheel or have an arm or leg on the dashboard, for example. The airbags are then lightweight bags made of nylon and equipped with large vents to ensure that the bag is deflated. Due to the presence of such vents, they offer a "window" of efficiency of a few hundredths ($\frac{1}{100}$) of a second, and therefore limited to the first impact. In addition, the most common current technologies do not allow gas volumes to exceed 1.5 moles. They are therefore limited to gas generation times of a few hundredths of a second. Finally, the seat belt tension is only effective when properly positioned. However, pre-tensioning cannot correct any shoulder clearance created by the passenger for comfort reasons.

In addition, the protection systems currently used in vehicles are essentially systems to protect the occupants of the vehicle, not pedestrians or bicycles.

In order to overcome these disadvantages, new gas generators are also being studied to allow for a modulated deployment of airbags, taking into account, in particular, the inertia mass of the passenger by means of information provided by seat occupancy sensor systems. However, these protection systems remain unsatisfactory to date in terms of deployment. In addition, the activation of the gas generators remains dependent on the shock itself.

Pedestrian protection systems have also been proposed in patents EP2599669 and U.S. Pat. No. 8,985,652. The systems described consist of airbags that deploy to the outside, at the windshield or at the bumper toward the front of the vehicle. However, these protection systems are also insufficient in terms of pedestrian protection. With regard to the system deployed at the windshield, the deployment of the airbag remains conditioned by the pedestrian's impact with the car. It provides no protection for the pedestrian's legs. With regard to the bumper deployment system, it does not provide pedestrian protection in the event of a pedestrian projection on the hood after an impact on the airbag. No protection is then provided after the first shock.

Application WO03/053751 also describes an airbag system located inside the front bumper of the vehicle, and arranged to deploy in the area above the bumper to prevent or mitigate injuries that would have been caused by a person hitting the vehicle grill or hood. The airbag system is activated as soon as an impact is predicted with certainty. However, it does not offer any adjustment of the response of the protection system between the time when the next impact is identified and the time when the shock takes place, and during the impact itself, and therefore remains unsatisfactory in terms of pedestrian protection.

The present disclosure aims to remedy these problems by providing a protection system to improve the protection of pedestrians and bicycles as well as the protection of vehicle occupants in the event of an impact.

BRIEF SUMMARY

To this end, and in a first aspect, the present disclosure proposes a protection system for a vehicle or mobile component comprising protective equipment equipping the vehicle or mobile component comprising at least one inflatable safety structure each associated with at least one gas generator that can be activated by an external control and an automated system responsible for controlling the critical safety functions of a vehicle or mobile component, the external control comprising an electrical signal coming from the automated system, and corresponding to predictive information of a shock, the protective system being remarkable in that the automated system is configured to control the activation over time of the inflatable structure alone or in combination with other protective equipment of the vehicle or mobile component based on information received before and during the shock, the gas generator is configured to generate a gas over a period such that the total duration of inflation (or deployment) of the inflatable structure is greater than 50 milliseconds, and preferably greater than 100 milliseconds and in that the inflatable structure is sealed.

Total inflation duration refers to the complete duration of the inflation, whether the generation is continuous or impulsive.

Sealed means without a damping vent. On the other hand, at least one pressure-controlled vent (cap) or electronically-controlled by the automated system regulating the deflation of the structure can be provided in the inflatable structure.

As used herein, the term "vehicle" includes the term mobile component.

Advantageously, the inflatable structure is equipped with at least one pressure-regulated vent or electronically-controlled by the automated system that regulates the deflation of the structure.

Advantageously, the inflatable structure comprises at least one series of bags having a tubular shape in the deployed position, the bags being assembled laterally and in fluid communication with each other, advantageously through regulated or unregulated vents. According to a particular configuration, fluid communication is ensured by one or more vent(s) regulated by the automated system.

Advantageously, the bags are assembled along a generatrix. According to a particular configuration, the distance between the bags is less than the diameter of the bags.

Advantageously, the inflatable structure comprises at least one series of bags made from two canvases, of identical or different thickness, and sealed along a generatrix.

Advantageously, the inflatable structure has at least one reinforcing bag in a tubular shape in the deployed position, extending transversely to the series of tubular bags at one end of the assembly. According to a particular embodiment, the reinforcement bag is extended laterally along the inflatable structure.

In a particularly advantageous configuration, the inflatable structure has a reinforcement bag extending transversely to the series of tubular bags at the lower end of the assembly. This bag can also extend laterally along the structure.

Advantageously, the inflatable structure has an additional protective bag that takes on a tubular shape in the deployed position and extends transversely to the series of tubular bags at the upper end of the assembly, which is configured to move from a deployed position to an arc-shaped position. Advantageously, the additional protective bag has an anisotropic thickness.

Advantageously, the inflatable structure has an additional reinforcing bag in a tubular shape in the deployed position, extending transversely to the series of tubular bags at the inflation module of the assembly.

Advantageously, the reinforcing bag and/or the additional protective bag is (are) in fluid communication with at least one of the tubular bags in the series of bags, fluid communication being ensured if necessary by regulated vents.

Advantageously, the bags are housed in a fabric matrix that ensures the shape of the inflatable structure.

Advantageously, all or part of the bags have an anisotropic thickness along a generatrix.

According to a specific implementation, the inflatable structure and gas generator are packaged in a module placed in a front part of the vehicle and are arranged so that the inflatable structure is partially deployed toward the front of the vehicle to avoid direct contact between the person and the vehicle.

Advantageously, the automated system is configured so that, in the event of a predicted shock with a person outside the vehicle, it activates the pressurization of the inflatable structure and the various vents to adjust the characteristics of the inflatable structure to the shock characteristics.

Advantageously, the module placed in a front part of the vehicle is placed on an articulated device that allows the automated system to change its orientation, attitude, and axial position.

According to another specific implementation, the inflatable structure consists of two series of bags in the shape of a tubular arc of a circle in the deployed position, the bags of each series being assembled laterally and in fluid communication with each other, each series of bags being integrated on either side of a vehicle seat and/or a headrest and comprising reciprocal fastening means. A structure so configured is advantageously designed to protect the vehicle passengers.

Advantageously, the inflatable structure consists of a single bag and at least one regulated vent for driver or passenger protection in the event of a frontal impact.

Advantageously, the inflatable structure consists of a series of bags whose ends are fixed on the dashboard at a distance shorter than its length for driver or passenger protection in the event of a frontal impact.

Advantageously, the inflatable structure is made of natural or synthetic rubber such as Polyvinyl chloride, Polyisobutylene, Polyurethane, Neoprene, Polyethylene, Nylon 6×6 coated Neoprene or Silicone, or Polyurethane.

Advantageously, the protection system includes at least one shock absorber operated by a cylinder and placed between at least one of the vehicle bumpers and a fixed part of the vehicle, the cylinder being controlled by the automated system.

Advantageously, the protection system includes at least one shock absorber whose absorption force is controlled by the automated system.

Advantageously, the protection system comprises at least one seat belt pre-tensioner that can be activated by the automated system and activated for more than 50 milliseconds.

Advantageously, the automated system is configured to select one or more inflatable structures and control the vent(s) equipping the structure(s), at least one of the shock absorbers and/or at least one of the seat belt pre-tensioners based on the established predictive information. Each inflatable structure is likely to deploy in a sequence programmed by the automated system.

Advantageously, the protection system includes a strap locking system at the top of the seats coupled with energy absorbers whose characteristics can be adjusted according to the morphology of the passenger installed on the seat and identified by the automated system.

Advantageously, the different activation systems are connected by wires, and preferably by a bus system, which also checks them in real time.

Advantageously, the gas generator has a first chamber containing homogeneous or composite solid propellant, and a second chamber containing a second composition consisting of a mixture of at least one oxidizing charge and at least one reducing charge, the solid propellant forming a block whose thickness and chemical characteristics are adjusted to ensure complete combustion of the gases in over 50 milliseconds. Advantageously, composite propellant has an oxidative charge mainly composed of ADN (Ammonium DiNitramide), while the second composition has an oxidative charge containing mainly ADN. The term "mainly" means more than 90% of ADN.

Advantageously, the gas generator has as its only homogeneous or composite propellant composition whose ballistic characteristics are adjusted to ensure complete combustion in more than 50 milliseconds. Advantageously, the oxidative charge of composite propellant is mainly composed of ADN (Ammonium DiNitramide).

Advantageously, the gas generator has a single composition consisting of a mixture of at least one oxidizing charge and at least one reducing charge, the decomposition of which is controlled by an energizing device configured to ensure complete gas generation in more than 50 milliseconds. Advantageously, the oxidizing charge contains mainly ADN (Ammonium DiNitramide).

Advantageously, compressed gases can be used alone or in addition to the generators described above.

The protection system is intended to be used, in particular, but not exclusively with an autonomous vehicle. The autonomous vehicle presents new opportunities in terms of accident anticipation to avoid it, but also by opening up possibilities to reduce the severity of an accident when it is inevitable. With the autonomous vehicle, the possibility of a front-to front shock can be detected at 150 m, i.e., around 9 seconds at 60 km/h, 4.5 seconds at 120 km/h before the impact.

The present disclosure also relates to a protection system comprising a seat belt pre-tensioner capable of being activated by an automated system responsible for controlling the critical safety functions of a vehicle and activated for a period exceeding 50 milliseconds. Advantageously, the protection system includes an inflatable structure and a gas generator as described above. Advantageously, the protection system includes a strap locking system at the top of the seats coupled with energy absorbers whose characteristics can be adjusted according to the morphology of the passenger installed on the seat and identified by the automated system.

The present disclosure also relates to a protection system comprising at least one shock absorber placed between at least one of the vehicle bumpers and a fixed part of the vehicle. Advantageously, the protection system includes an inflatable structure and a gas generator as described herein.

BRIEF DESCRIPTION OF THE DRAWINGS

Further objectives and advantages of the present disclosure will become apparent from the following description made in reference to the appended drawings.

For greater clarity, identical or similar elements of the different embodiments are marked by identical reference signs on all the figures.

DETAILED DESCRIPTION

A protection system is described with reference to the figures for equipping a vehicle comprising protection equipment comprising at least one inflatable safety structure, each structure being associated, respectively, with at least one gas generator. The protection system comprises an automated system controlling the deployment of the inflatable structure(s) by activation of the associated gas generator(s), as well as the deployment of other protection equipment with which the vehicle is equipped. Only the inflatable structures, equipping the vehicle or one of its parts, are shown.

An automated system may be used for controlling the inflatable structures and other protective equipment.

The automated system is responsible for controlling the critical safety functions of the vehicle equipped with the protection systems, which, as critical safety functions, correspond to predictive information of an impact in time and nature of the obstacle.

More specifically, the automated system includes means for analyzing information from the vehicle automatic steering system or driver assistance system relating to the vehicle and the vehicle environment in order to establish whether or not an impact has been predicted in time and nature. All information received by the vehicle is information relating to the outside of the vehicle, such as the position and speed of all vehicles involved, the position of persons or obstacles, etc., and information relating to the occupants of the vehicle, such as the position and build of each passenger, the presence of a child, a baby in a car seat, etc.

The automated system shall also include a control unit that, on the basis of the information received and analyzed, shall be active when the prediction of an impact is established in time and nature of the obstacle, the inflatable structure(s) and other appropriate protective equipment which will make it possible to minimize the effects of the shock on persons. The reception and analysis of vehicle information and that of its environment are carried out continuously. The automated system adjusts the response of the protection system from the information received before and during the shock by controlling, through its Artificial Intelligence, the activation in space and time (spatio-temporal) of a single or a combination of several protection device(s) with which the vehicle is equipped. Thus, thanks to the analysis of all the information received before and during a critical event by the various sensors of the autonomous vehicle control system or the driving assistance system of a mobile system, the automated system adapts a specific response to each accident configuration.

Depending on the information collected and analyzed, which characterizes the so-called predictive information, the automated system controls the activation of one or a combination of the protective elements with which the vehicle is equipped, chosen from an inflatable structure constituting protection for pedestrians and bicycles, an inflatable structure equipping the vehicle seats (passenger seat, child seat or baby seat), frontal or lateral inflatable structures, one or more belt pre-tensioners, a front shock absorber, a rear shock absorber. Examples of protection elements will be presented below.

The automated system operates downstream of the basic system location and analysis systems that, when an adverse event occurs within a few seconds or fractions of a second, and after having taken all decisions to avoid or stop the emergency, activates the protection systems. It may also be foreseen that the automated system also triggers a maneuver in advance to optimize the performance of the protection systems.

For example, the automated system can, according to a particularly advantageous embodiment, intervene on the vehicle trajectory or the direction of the pedestrian protection module to optimize the configuration of the shock. This will be the case, in particular, when the vehicle concerned is a motorcycle for which a position perpendicular to the obstacle allows the frontal inflatable structure to be fully effective.

Advantageously, the automated system ensures that all passengers wear their seat belts at all times. This may prevent the vehicle from starting or at least from driving when it is detected that not all occupants of the vehicle fastened their seat belts.

Advantageously, the different activation systems are connected by wires, and preferably a bus system that also checks them in real time. Advantageously, a specific flowchart for each vehicle makes it possible to optimize the various protective equipment (inflatable structure or others).

The inflatable structures used include sealed bags, assembled together and communicating with each other through regulated vents. Heat and gas losses during all operational phases are thus limited, while effluents and any dust are retained in the bag. It may also be necessary to add additives (hopcalite, talc, zinc oxide, etc.) to the bags in order to treat the effluents retained in them. "Additives added to bags" refers to additives contained in the structure of the bag itself or placed inside it. Regulated vents can take different forms. They can be either automatic, such as calibrated holes, a gate or similar opening at a predetermined pressure, or controlled, such as a membrane subjected to a pyrotechnic device, a valve or similar. According to another particular embodiment, the vents can be replaced by independent gas generators. Advantageously, the vents between the different airbags can be equipped with a check device.

Depending on the application for which the inflatable structure is intended, it is preferable to use an inflatable structure formed by a plurality of bags laterally assembled together and in fluid communication with each other through regulated vents, the bags taking a tubular shape in the deployed position by activating the gas generator(s) associated with the inflatable structure. According to a particular and advantageous configuration, the bags form tubes from 3 to 6 cm in diameter with an adapted length in the deployed position, the distance between two successive tubes being less than their radius. They are preferably pressurized under 0.12 to 0.20 absolute MPA as required, and preferably under 0.14+/−0.02 absolute MPA. In the versions described below, due to "long" inflation times, up to ten times longer than current technologies, the bag materials can be relatively thick. They can be made of PVC (Polyvinyl chloride) or any other material of the type used to make Zodiac® type inflatable boats. Other materials are possible, such as nylon 6×6, neoprene or silicone coated, or polyurethane. According to a particular configuration, inflatable structures have a matrix made of fabric inside which the tubular bags are placed. The matrix is arranged to define the shape of the inflatable structure. The fabric matrix adjusts to the mechanical protection needs of the bags and the desired shapes. According to this configuration, the bags are advantageously made of nylon 6×6, neoprene or silicone coated, or polyurethane.

Each tubular bag is connected with the bags directly adjacent by a strip of fabric, preferably of the same material as the tubular bags. According to a particular exemplary embodiment, for 6-centimeter tubular bags, the fabric strips are 4 centimeters wide. The fabric strips define junction zones 5.

Inflatable structures are advantageously made from two superposed fabric strips, preferably of the same material, fixed together. FIG. 3 shows exemplary embodiments of a multi-tubular structure. The tubular bags are preformed either by the two fabric strips (FIGS. 4a, 4c) or by only one of the strips. The strips can be distributed symmetrically or asymmetrically. In the latter case, the distance between two folds will be equal to the diameter of the tube increased by the distance between the tubes. In the case of a 6 cm diameter tube and 4 cm junction areas, the distance between two folds will be 10 cm.

Figure 8:
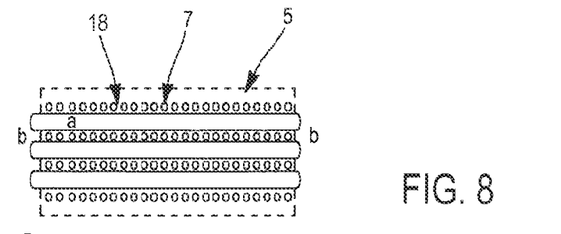
FIGS. 8 and 9 represent a transparent top view of an inflatable structure in rectangular and trapezoidal shape, respectively, made according to one of the arrangements in FIG. 3.

Advantageously, the two fabric strips are welded or glued together at the junction areas. The sealing 7 or bonding is advantageously carried out discontinuously at each of the junction zones 5, so as to create a transverse communication between the bags (vents 18) and thus ensure a distribution of the gases during inflation and thus the balance of pressures (FIG. 8).

Figure 9:
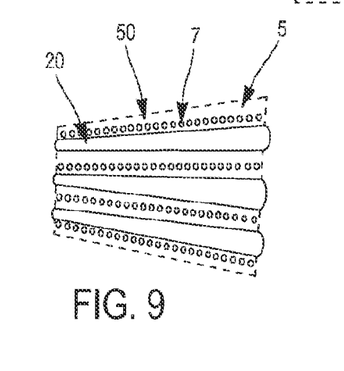
Figure 10:
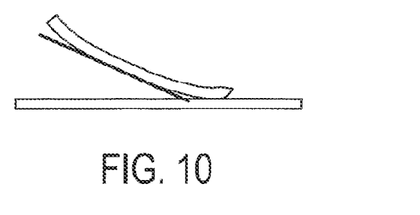
FIG. 10 represents a lateral schematic view of an inflatable structure in a curved shape, for example, as shown in FIG. 3, but with two canvases of different thicknesses.

In the above, the junction zones 5 and the tubular bags 2 have a constant width and diameter, respectively. The inflatable structure thus has a substantially flat and rectangular shape. Depending on the needs, an inflatable structure with a trapezoidal shape can be advantageously provided as shown in FIG. 9. To do this, the inflatable structure includes junction zones 5 with increasing width and tubular bags 20 with an anisotropic thickness (thickness varies along a generatrix). An inflatable structure with a curved shape can also be advantageously provided as shown in FIG. 10. In this case, the upper fabric of the inflatable structure has a higher rigidity than the lower fabric. It is understood that depending on the shape or curvature needs, the thickness of the tubes, the widths of the junction zones and the type of fabric used will be determined.

Advantageously, these configurations can be implemented whether the structure consists only of tubular bags communicating with each other or a textile matrix shaped by the tubular bags placed inside it.

Figure 2:
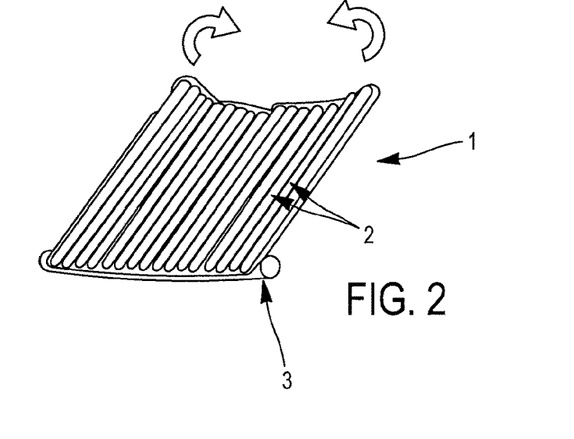
FIG. 2 is a detail view of the inflatable structure illustrated in FIG. 1.
Figure 3A:
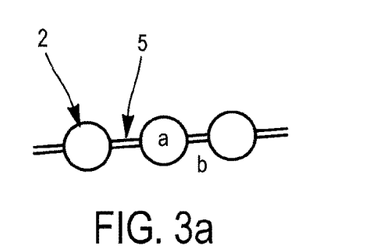
FIG. 3 shows exemplary embodiments of an inflatable structure consisting of two assembled canvases.
Figure 3B:
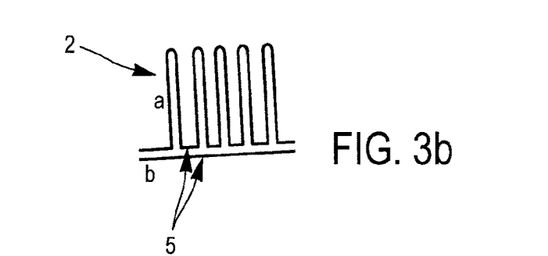
Figure 3C:
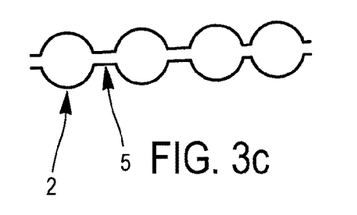
Figure 3D:
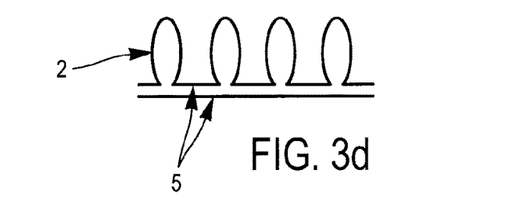

Depending on the protection for which the inflatable structures are intended, they may have a flat curtain-type arrangement, an example of which is shown in FIG. 2 or a shell-type arrangement of the type shown in FIGS. 9, 12 and 15.

The "flat" arrangement will be preferred for pedestrian protection or lateral protection. The "shell" arrangement will be preferred for the protection of the occupants of vehicle 50 or for shock absorbers. It is of course obvious, however, that flat or shell arrangements can be used for either protection. FIG. 12 illustrates a shell arrangement for pedestrian protection.

Figure 4A:
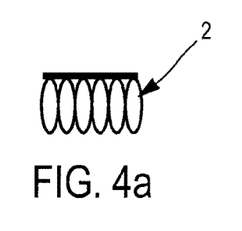
FIGS. 4a and 4b represent an example of an assembly of bags constituting a "shell" inflatable structure (deploying in the shape of an arc of a circle), in the respective non-deployed and deployed positions.
Figure 4B:
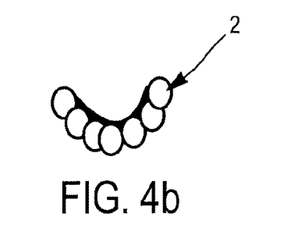
Figure 5:
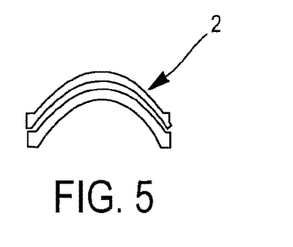
FIG. 5 represents a view of a bag of an inflatable structure that provides a shock absorber or reinforcement R of the inflatable structure as shown in FIG. 13.
Figure 6:
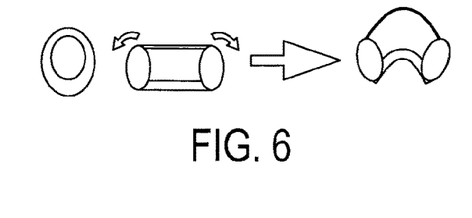
FIGS. 6 and 7 illustrate examples of tubular bag arrangements for the construction of a "shell" inflatable structure (expanding in the shape of an arc of a circle), one of the arrangements providing for an anisotropic "thickness" tube ("anisotropic" thickness, means a thickness that varies along a generatrix) (FIG. 6), the other arrangement providing for close folds (FIG. 7). Through the play of the supply vents, the rotational movement is progressive from the generator.
Figure 7:
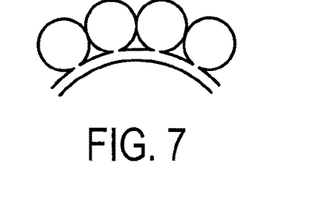

The shell arrangement is obtained by assembling tubes along a generatrix, with a distance between the tubes smaller than the diameter (FIGS. 4a, 4b, 7). When inflating the bags, given their assembly and arrangement relative to each other, the bags bend. The "shell" arrangement can also be obtained by providing for a variation in thickness along a generatrix (anisotropic thickness) (FIG. 6). As before, the bags, when pressurized, bend. According to another implementation illustrated in FIG. 5, it may also be planned to block the tubular bags for a distance less than their length so that they deploy into an arc. Such an arrangement will be advantageously implemented to form shock absorbers or to reinforce the pedestrian bag.

Figure 1:
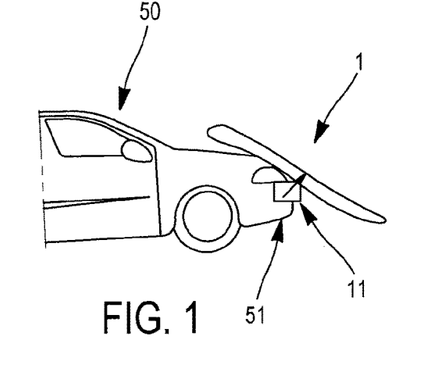
FIG. 1 represents a schematic view of a vehicle comprising an inflatable structure according to an exemplary embodiment of a pedestrian protection system according to the present disclosure, the inflatable structure being shown in the deployed position.

FIGS. 1 and 2 illustrate an example of an inflatable structure 1 used to protect pedestrians and bicycles.

The inflatable structure 1 and the associated gas generator 11 are conveniently located at the front of the vehicle 50. In the example shown in FIG. 1, the two parts are placed in a module located on the bumper 51 of the vehicle 50. They could also be placed on the grille. The module, shown in FIG. 14, will be described below in conjunction with another configuration of the inflatable structure. Regardless of the configuration, the two parts are arranged so that, in the event of a shock predicted by the automated system, the inflatable structure 1 deploys toward the front of the vehicle 50 and onto all or part of the bumper as shown in FIG. 1. Thus, the inflatable structure 1, in the deployed position, includes a part extending beyond vehicle 50 toward the front of the vehicle and a second part covering the grille and extending above the bonnet. The front part advances advantageously from one meter to +/−0.5 meter in front of vehicle 50 so that the first shock of the pedestrian with the vehicle is made on the inflatable structure 1. In the configuration shown, the inflatable structure 1 is sized to extend over only half of the hood. Different dimensions may of course be provided for, in particular, such a dimensioning that the second part extends to the windscreen of vehicle 50 without leaving the scope of the present disclosure. Thus the pedestrian shock is not made in a vertical position with the vehicle 50 but with an angle. This greatly reduces the shock on the grille of the vehicle 50.

Advantageously, the inflatable structure 1 to protect pedestrians and bicycles, consists of a series of bags 2 assembled laterally and in fluid communication with each other. FIG. 2 shows an example of such an inflatable structure 1, with the bags 2 constituting it in the deployed position, respectively.

In the embodiment illustrated, inflatable structure 1 is a PVC bag with dimensions of 2.2 m×1.4 m. It consists of 16 bags 2 able to take, respectively, a tubular shape in deployed position. Each bag, inflated to a pressure of 0.15 MPA, has a diameter of 6 cm and a length of 2.20 m in the deployed position. Bags 2 are separated from each other by an average of 3 cm.

The structure also includes a complementary bag called reinforcement bag 3 extending transversely to the set of juxtaposed tubular bags 2, in the lower part, also referred to as the front part of the set with reference to its positioning with respect to vehicle 50 when the inflatable structure 1 is deployed. The reinforcement bag is in fluid communication with at least one of the juxtaposed tubular bags 2 of the assembly. Attached to the series of bags 2 fixed side by side, the reinforcement bag is used to reinforce the front part of the inflatable structure 1. According to a given exemplary embodiment, the reinforcement bag 3 has a tubular shape with a diameter of 6 cm and a length of 1.4 m in the deployed position.

Figure 11:
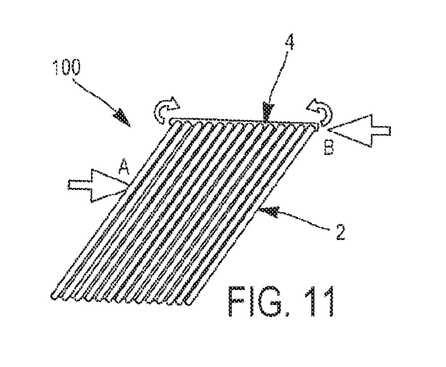
FIG. 11 shows a top view of an inflatable structure.

An additional protective bag extending transversely to the set of juxtaposed tubular bags 2 at the top of the latter may also be provided (FIG. 11). According to a given exemplary embodiment, the additional protection bag has a tubular shape in the deployed position with dimensions identical to those of the reinforcement bag 3, i.e., a diameter of 6 cm, a length of 1.4 m. with a variable thickness along a generatrix: double against the bag, single external side. The additional bag placed in the upper part has the function of "closing" the protection set consisting of the series of bags 2. To do this, the additional bag has an anisotropic thickness so that it curves when pressurized and thus acts as a shell to keep the pedestrian on the vehicle. The additional bag is inflated either through calibrated orifices from bag series 2, or by an independent gas generator controlled by the automated system or by another device.

Although not shown, an additional bag may also be provided around the gas generator placed in a module in the middle of the inflatable structure and extending transversely to the set of juxtaposed tubular bags 2.

The gas generator 11, advantageously used with inflatable structure 1 for pedestrian protection, has the characteristics defined in the following table.

| primary charge | Double base 1133 weight 8 g |
| --- | --- |
| Secondary charge | Mixture 18 NA + 4 g NiGu in prills |
| Combustion time | 300 ms |

Prills means a powdery composition assembled into porous grains. Prills is obtained by quenching a mixture in a gaseous state or by rapid evaporation of a liquid mixture.

It should be understood that the deployment is carried out before the impact of the shock. For example, at 35 km/h, the inflatable structure 1 only needs to be activated 5 meters (0.5 seconds) before the impact. This support for the deployment of inflatable structure 1 is carried out by the automated system with which the relative position of the car with respect to pedestrians, cyclists or any other obstacle has been determined.

Figure 12A:
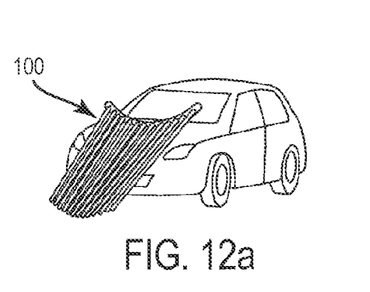
FIGS. 12a and 12b represent the inflatable structure of FIGS. 11 and 2 used with a vehicle for the protection of a pedestrian, the structure being represented, respectively, in the deployed position a and b in the closed position by activating the bag structure B illustrated in FIG. 11.
Figure 12B:
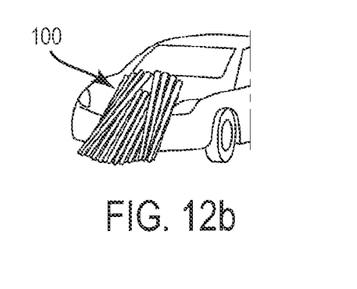

FIGS. 11 and 12a and 12b illustrate another example of an inflatable structure 100 used to protect pedestrians and bicycles.

The inflatable structure 100 comprises a main structure A, advantageously of size 140×220 cm, formed of several tubular bags, in the example 14 bags and a mono-tubular inflatable structure B, extending transversely to all the tubular bags 2 of the main structure, in the upper part thereof. Advantageously, the bags of the main structure A have a length of 220 cm and a diameter of 6 cm while the bag constituting the structure B has a length of 140 cm and a diameter of 6 cm.

The tubular bags of the main structure A are joined together laterally by a 4 cm thick junction zone of their material. As described above, the main structure A is made from two canvases formed and welded together to form the junction zones connecting the bags together, which are provided with vents allowing fluid transverse communication between the tubular bags.

The function of the transverse single-tubular inflatable structure B, placed at the top of the inflatable structure 100, is to "close" the protective assembly consisting of the series of bags 2 as shown in FIG. 11. To do this, the additional bag has a variable thickness (anisotropic thickness) so that it curves circularly under an internal relative pressure of 1.4+/−0.2 Pa absolute and thus acts as a shell to keep the pedestrian on the vehicle. The additional bag is advantageously in fluid communication with at least one of the tubular bags of the main body of the inflatable structure. It can also, according to another configuration, be associated with an independent gas generator controlled by the automated system or by another device.

In addition, a transverse bag can be provided, as a generator/bag interface, to facilitate the distribution of gases between the bags on the one hand and to stiffen the structure laterally on the other hand.

Figure 14A:
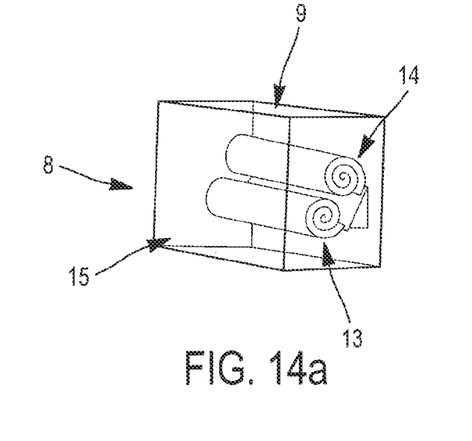
FIG. 14 shows the module in which the generator and the inflatable structure are housed: the generator is in the center of the inflatable structure, the two parts of the structure are folded and rolled up so that each part deploys independently.
Figure 14B:
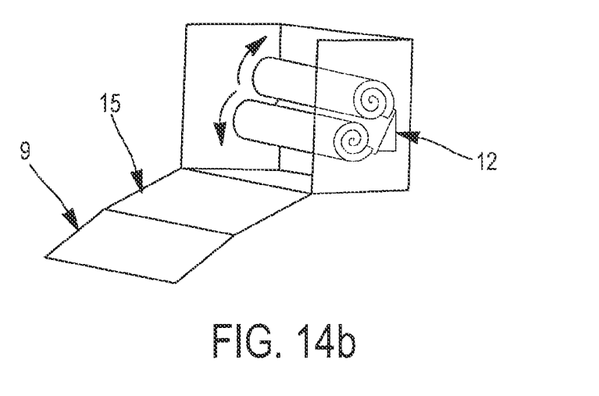

The inflatable structure 100 and the associated gas generator 11 are advantageously housed, as in the example described above, in the front of vehicle 50, in a module 8 located in the bumper 51 of vehicle 50 (FIG. 14). Module 8, of rectangular parallelepiped shape, has a top lateral wall 9 integral with side wall 15 that can be deployed forward to form a passage opening for the inflatable structure when deployed as shown in FIG. 14b. The upper and lateral walls 9, 15 constitute, when opened, a platform capable of giving the inclination of the front part of the inflatable structure. The module is conveniently located at bumper level and has a wall height of less than 0.5 m from the ground.

The inflatable structure is fixed on a plate 12 of the module, itself fixed to the vehicle. This plate 12 helps to give the initial inclination (attitude) of the inflatable structure which is, in this exemplary embodiment, 30° with respect to the ground. The inflatable structure is arranged in the module folded into two helical windings 13, 14 (mother-in-law's tongue), one of the windings 13 being intended to deploy forward guided by the plate 12 and the platform created when the module is opened, the other winding 14 being intended to deploy vertically toward the hood.

Advantageously, it is possible to provide a hinge on the plate 12 to adjust the attitude and even the orientation of the inflatable structure, and if necessary, a cylinder to move the module forward. The presence of such a cylinder is particularly relevant in cases where the front of the vehicle is vertical, such as trucks, buses, trams, etc.

In the example described, the gas generator is arranged to supply four of the bags in structure A, preferably the centrally placed bags, the other bags being supplied through the communications provided between the bags, the pressurization of these four bags ensuring the deployment of the structure axially and then gradually laterally through the communication between the bags.

The full deployment of inflatable structure B is ensured when the pedestrian takes position on the main structure (FIG. 12a). The inflatable structure B closes once the pedestrian is received by structure A, encircling the pedestrian (FIG. 12b) so as to contain the pedestrian's axial thrust. The trigger can be triggered, for example, by a delay in relation to the initial trigger, either by the pressure variation due to the pedestrian's pressure on the inflatable structure or by the vision system of the automated system.

The pedestrian kinematics is as follows:

When it identifies the shock with the pedestrian as certain, the automated system instructs to inflate structure A so that it is operational when the pedestrian is 1 m from the vehicle, the module is positioned 0.5 m above the ground, the bag is inclined at 30° to the vehicle axis of travel, and the emergency braking is already active. However, depending on the circumstances and availability, the automated system will have the possibility to modify the attitude and direction of the inflatable structure. In addition, in the case of vehicles with a vertical front face, the module will be advanced by a cylinder provided for this purpose.

When the speed at the time of the impact is 35 km/h, the implementation time of the inflatable structure is 300 ms, which corresponds to 3 m of distance covered by the vehicle. The order is therefore given by the automated system when the pedestrian is 4 m away from the vehicle. During the shock, the pedestrian swings over the inflatable structure and his head is in contact at 150-200 ms after the shock. Structure B is then deployed. The stopping time of the vehicle is about one second. Inflatable structure A has sufficient roughness that, when coupled with structure B, consumes the vehicle/pedestrian speed differential and keeps pedestrians on the vehicle hood.

Figure 13:
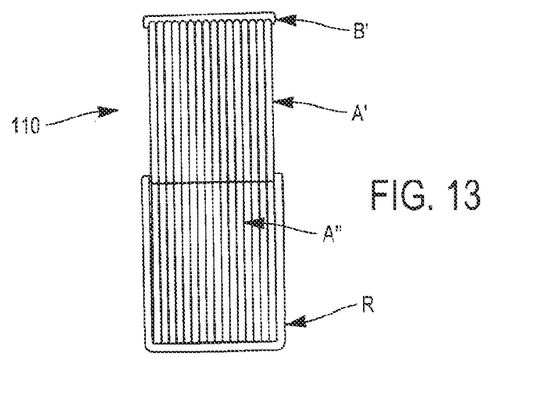
FIG. 13 represents a top view of an inflatable structure in a different configuration: the inflatable structure consists of 4 independent parts—parts A' and A", which are substantially identical to part A of FIG. 11, structure B', which is identical to structure B of FIG. 11, and a structure R to stiffen the inflatable structure.

FIG. 13 illustrates another example of an inflatable structure 110 implemented for the protection of pedestrians and bicycles. In this example, the inflatable structure has three structures: two main structures, designated A' and A", identical to structure A of inflatable structure 100 with dimensions for A' and A" of 110×140 cm, and one structure, designated B', identical to structure B of inflatable structure 100.

A U-shaped airbag completes structure A". This bag gives greater rigidity to the structure A" by pressurization. It can be pressurized from the other bags or independently. Advantageously, the same gas generator is used. The rigidity provided by the U-shaped bag of A" makes it possible to take care of people on the ground. It may or may not be systematically engaged.

As in the previous example, structures A' and A" can be anisotropic to obtain an inflatable structure with a curved shape. The upper surface of structures A' and A" can also be reinforced with respect to the lower surface, the reinforcements used can be modulated to favour certain areas. Similarly, structures A' and A" can be configured to define an inflatable trapezoidal structure.

An electronically regulated vent isolates structure A' from structure A". Structure A' is inflated first via the gas generator and then, when the nominal pressure is reached, the regulated vent opens, allowing structure A" to inflate. The opening of the vent can occur either by a delay in relation to the initial trip, by reaching a predetermined pressure threshold, or by the vision system of the automated system.

The inflation sequence of structure A" takes 150 ms. The inflation of structure A' and then structure B' is then identical to the previous case, structure B' being implemented 200 ms after the impact. In other words, when the impact velocity is 35 km/h, the inflation time of the inflatable structure A" is 150 ms, which corresponds to 1.5 m of distance travelled by the vehicle, the order to activate the gas generator is given when the pedestrian is 2.5 m from the vehicle. This configuration therefore allows a decision to activate the system when the pedestrian is 2.5 m (250 ms) from the vehicle compared to 4 m (400 ms) in the previous case. It should be noted that if the vehicle speed is 50 km/h, the activation of the pressurization is triggered at 6 m in the previous example and 3.5 m in this example.

Depending on the relative speed of the vehicles and their positions, the automated system can also activate inflatable structures inside the vehicle.

Figure 15A:
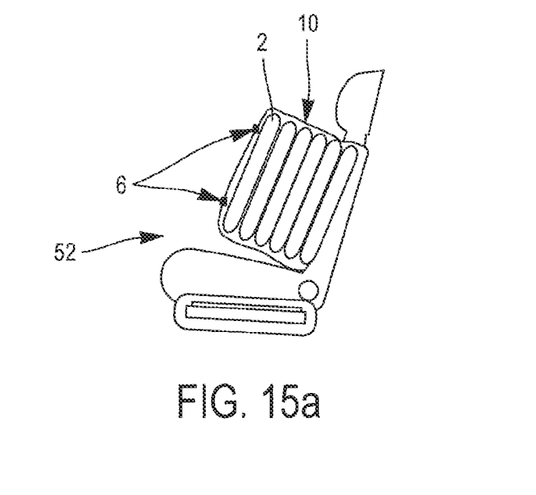
FIGS. 15a and 15b represent a side and front view, respectively, of a vehicle seat equipped with an inflatable structure according to another exemplary embodiment of the protection system according to the present disclosure.
Figure 15B:
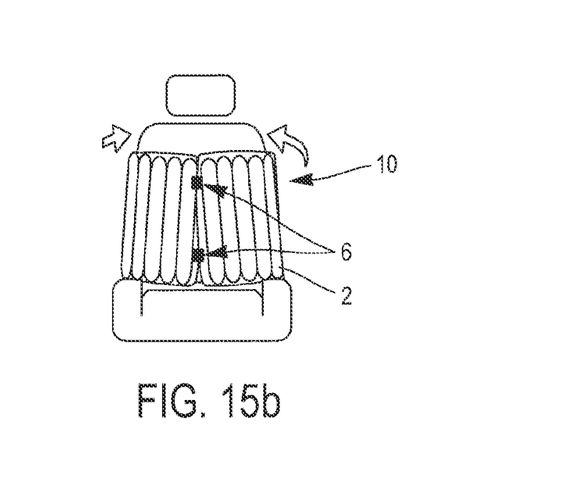

FIGS. 15a and 15b show an example of an inflatable structure 10 used to protect vehicle occupants. To do this, the inflatable structure 10 and the gas generator (not shown) are integrated into the seat 52. The seat 52 can be a vehicle-specific seat or an attached seat such as a child seat.

In the embodiment illustrated, the inflatable structure 10 is made up of two series of bags 2 each taking the shape of an arc of a circle in the deployed position. As with the inflatable pedestrian protection structure 10, the bags 2 of each series are assembled laterally and in fluid communication with each other. Each series of bags 2, arranged on either side of the backrest of the seat 52, includes reciprocal means of attachment 6, such as magnets associated with hooks (FIG. 16) or others, to enable the two series of bags 2 to be secured to each other when the inflatable structure 10 is in the deployed position. According to a given exemplary embodiment, the bags 2 have a tubular shape in the deployed position with a diameter of 6 cm and a length of 1.2 m. The required volumes are about 10 liters. The generators can be made of propellant alone.

The bags 2 of the two series are arranged at a seat 52 of the vehicle 50 to deploy with respect to each other so as to form an arched protective envelope extending around the passenger seated on the seat 52. They thus define a curtain-type protection. Through the clearance of thickness or distance between the tubes, the shape of the arc can be adjusted as required.

According to a specific exemplary embodiment, each series of bags consists of ten bags with a diameter of 6 cm and a length of 60 cm. Each series is made according to the examples illustrated in FIGS. 3b and 3d: they are made up of two strips of fabric assembled together discontinuously to form the vents for fluid communication, one of the strips of fabric preforming bags close enough to develop into an arc of a circle when pressurized, the vents between bags ensuring a progressive inflation of the successive bags to hold the inflatable structure against the passenger. Advantageously, a single generator ensures the pressurization of both structures.

In order to allow the series to be hooked together, a delay in their deployment is planned. Thus one of the series unfolds first (preferably the series closest to the passenger) with a delay of a few tens of ms compared to the other series.

Figure 16:
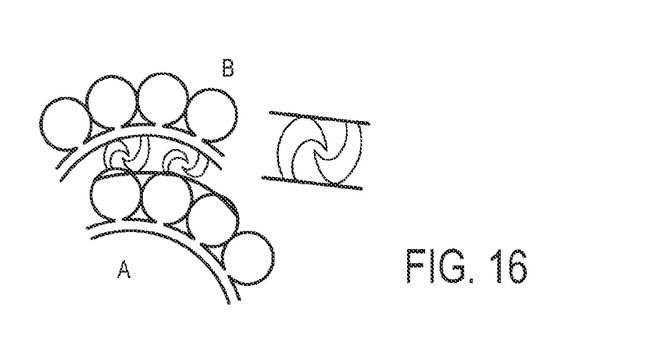
FIG. 16 is a detail view of the inflatable structure illustrated in FIGS. 15a and 15b.

A hanging surface (e.g., magnets associated with hooks as shown in FIG. 16) will be deployed on the bags of one of the series while on the other series, the corresponding hanging surface will be provided on the inner side. The inner side refers to the side facing the passenger protected by the inflatable structure.

The gas generator advantageously used with such an inflatable structure has the characteristics defined in the following table.

| primary charge | Double base 1133 weight 4 g |
|---|---|
| Secondary charge | Mixture 7 g NA + 1.5 g NiGu in prills |
| Combustion time | 300 ms |

It may also be possible to increase the volume of the bags in the upper part to create a neck brace for the passenger. For example, the bags may have a lobe shape at the upper end. It may also be possible to install one or two additional bag(s) for the same purpose. It may also be possible to increase the inflatable from 60 to 80 or 120 cm to support the passenger's head.

According to another configuration, a second inflatable structure, identical to the previous one, can also be provided, arranged to deploy in the upper part (possibly on the headrest) in order to support the upper chest and head.

The pressurization time can also be reduced as required.

Similar inflatable structures may also be provided to protect the occupants of a vehicle such as curtain airbags, front inflatable airbags. The advantage of pressurizing them with long time generators is that they can be deployed non-aggressively, the inflation time and therefore the efficiency can be increased to several seconds.

In particular, curtain airbags protect passengers in the event of a side shock. The automated system makes it possible to anticipate the shock. According to an advantageous configuration, the inflatable curtain structure, measuring 70×140 cm, contains seven tubular bags 140 cm long and 6 cm in diameter. The tubes are assembled by a 4 cm junction zone constituting their material. The design is identical to that of the inflatable structure used for pedestrian protection.

For example, for an operating time of 300 ms, the gas generator has the following characteristics:

| primary charge | Double base 1133 weight 4 g |
|---|---|
| Secondary charge | Mixture 9 g NA + 2 g NiGu |
| Combustion time | 300 ms |

Such a generator thus ensures an efficiency duration of the inflatable structure of about two seconds.

The long time inflation of the front airbags with a volume of 601 and 1101 in their current form avoids or strongly limits the risks for "out of position" persons (too close, too far from the airbag). The progressive deployment limits the aggressiveness of the airbag. In addition, as it is sealed, its efficiency window is very wide for passengers far from the airbag. It allows the use of all the types of materials mentioned above. Its vents controlled by the automated system optimize deflation according to the position, the morphology of the people and also the kinematics of the vehicle.

If the front shock absorber is activated, the bag is deployed upon the first contact with the obstacle to ensure passenger/vehicle coupling, deflation only occurs when the vehicle is immobilized.

An inflatable structure can also be provided for a front passenger configuration. The inflatable structure, blocked at both ends for a distance less than its length, will bend and provide a shock absorber. In an advantageous configuration, the inflatable front passenger structure consists of five tubular bags, 6 cm in diameter and 1.2 m long, the bags being spaced 4 cm apart and blocked over a length of 80 cm. The inflatable structure will form an arc with a radius of 40 cm by inflating. Compared to a 1101 passenger bag, the volume of the bags is 13 liters, i.e., a mass of active ingredient 10 times lower than current solutions.

| primary charge | Double base 1133 weight 5 g |
|---|---|
| Secondary charge | 0 |

An inflatable structure with a wide mesh textile matrix containing the bags is particularly suitable for this application. This limits the blast effect. Large mesh, means a mesh from 1 to 10 mm.

This inflatable structure is advantageously adapted for both front seats of the vehicle if the steering wheel has been removed, and adapted to the steering wheel if it is maintained.

A single bag capable of making a tubular shape integrated on one side of the seat so as to provide lateral protection in the event of a side shock may also be provided in place of the two series of bags 2 placed on either side of the seat backrest.

Although seat airbags should protect a child in a child seat, it may also be provided in the case of child protection, replacing the two sets of bags 2 placed on either side of the seat back, a lap belt or an inflatable tablet.

In order to improve the protection of the occupants of vehicle 50, it may be provided that the protection system includes a system for locking the straps at the top of the seats coupled with energy absorbers whose characteristics can be adjusted by the automated system according to the morphology of the passenger installed on the seat and identified by this system.

Advantageously, in addition to an integrated inflatable structure 10, the seat is configured to be axially movable so as to contribute to the absorption of a frontal or rear impact.

Other protective elements can also be provided.

In the case of protection of vehicle 50 occupants in the event of a frontal impact, two types of protection are provided depending on whether the steering wheel is held or not.

When the steering wheel is held, the inflatable structure is a 60-liter sealed bag, with a classic shape, in Nylon or Zodiac type, for example, vents regulated by pressure (cover) or electronically by the automated system regulating the deflation of the bag when the occupant decelerates when the vehicle is immobilized.

This regulation of the controlled vent is particularly relevant when the vehicle uses its shock absorbers to reduce the impact velocity, the occupant benefits from the corresponding deceleration, and then uses the deflation of the bag when the vehicle is immobilized.

When the steering wheel is not held, an inflatable structure may be provided consisting of 6 tubular bags 2, 6 cm in diameter and 1.2 m long, spaced 3 cm apart, and placed on the dashboard. The characteristics of the gas generator used are preferably those indicated in the table below.

| primary charge | Double base 1133 weight 3 g |
| Secondary charge | Mixture 6 g NA + 1 g NiGu in prills |

Alternatively, two inflatable structures, one on the driver's side and the other on the passenger's side, may be provided as a replacement for the inflatable structure consisting of 6 bags, 2 of which are locked for a distance less than its length so that they deploy in an arc when the associated generator is activated. According to an exemplary embodiment, each inflatable structure consists of 6 tubular bags 2 of diameter 6 cm in length 0.6 m. They are advantageously located at a distance of 0.4 m. The characteristics of the gas generator used are preferably those indicated in the table below.

| primary charge | Double base 1133 weight 5 g |
| Secondary charge | 0 |

In order to improve the protection of the vehicle occupants, the automated system may also activate one or more shock absorbers placed between at least one of the vehicle 50 front and/or rear bumpers and a fixed part of the vehicle to reduce impact velocity. More specifically, the automated system makes it possible to activate the cylinders that make the shock absorber(s) operational. The vehicle bumpers are thus displaced axially from their initial position, advantageously in the range of 30 to 50 cm and a shock absorber connects them to a stationary front and rear part of the vehicle. The automated system adjusts the stiffness of the absorber so that upon impact the severity of the shock is less than that of a 60 km/h shock against a fixed obstacle. To reduce a vehicle speed from 120 km/h to 60 km/h over 40 cm, the deceleration is of the same order as that required to reduce the passenger's speed from 60 km/h to 0. Thus, thanks to the automated system, the anticipation of the accident allows for better protection of people. Similarly, violent rear shocks cause "whiplash" for passengers in the front position. The purpose of the rear shock absorber is to reduce the impact velocity. The automated system will have to take into account the real situation in and out of the vehicle. Their activation will be limited to cases of exceptional accident severity. The pyrotechnic charges required to install the absorbers are close to those of the pre-tensioners (0.5 to 3 g).

The gas generator is configured to generate a gas over a period of time such that the total duration of inflation of the inflatable structure is greater than 50 milliseconds.

The realization of an inflation over such a period can be obtained via a double chamber generator comprising, respectively, a so-called primary and a so-called secondary charge, such as the gas generator described in application WO01/89885. Thus, and advantageously, the primary charge consists of homogeneous or composite propellant, and the secondary charge consists of an oxido-reducing mixture such as Ammonium Nitrate/Guanidine Nitrate. The gas generation time is 0.05 to 2.5 s, the gas volume is a fraction of a mole to 4 moles, and the gas temperature in the generator is between 1500K and 600K. The durations and volumes are of course not limited to these quoted values alone.

Advantageously, the composite propellant is of the Butalane type, with an oxidizing charge consisting of Ammonium Perchlorate or ADN (Ammonium DiNitramide), and the Ammonium nitrate of the secondary charge is replaced in whole or in part by ADN.

For example, for the inflation of a 60-liter inflatable structure intended to protect the driver (structure consisting of a single bag), the primary charge is a Double base 1133 propellant, the evacuation chamber is downstream of the other two chambers. The surface of the central hole of the grid or plate is distributed around the periphery. An example of the charge composition and generator characteristics is given in the tables below.

| primary charge | Double base 1133 weight 3 g |
| Secondary charge | Mixture 11 g NA + 4 g NiGu |

| | Primary chamber | Secondary chamber | 60-L Tank under Nitrogen | | |
|---|---|---|---|---|---|
| | Pmax MPa | Pmax MPa | Pmax MPa | TFP ms | Tps at Pmax ms |
| +20 | 7.0 | 3.0 | 0.15 | | 300 |

For the inflation of a 110-liter inflatable structure intended for protection, it is advantageously provided with a generator comprising the characteristics and a composition of charges indicated in the tables below.

| primary charge | Double base 1133 weight 8 g |
|---|---|
| Secondary charge | Mixture 18 g NA + 4 g NiGu |

| Primary chamber | Secondary chamber | 60-L Tank under Nitrogen | | |
|---|---|---|---|---|
| Pmoy MPa | Pmoy MPa | Pmax MPa | TFP ms | Tps at Pmax ms |
| +20 | 5.0 | 2.6 | 0.4 | 295 |

Whether it is a 60- or 110-liter inflatable structure, the material chosen is a material that expands little under the effect of pressure. It may be Nylon, for instance. As the inflatable structure is sealed, a vent is advantageously provided to regulate the deflation of the bag when the occupant decelerates and thus absorb the kinetic energy of the occupant. This vent is either sealed to open only at a predetermined pressure or controlled by the automated system (passive safety enhancement system). This regulation of the controlled vent is particularly relevant when the vehicle uses its shock absorbers to reduce the impact velocity, the occupant benefits from the corresponding deceleration, and then uses the deflation of the bag when the vehicle is immobilized.

The 2 Nylon bags can be replaced by inflatable PVC structures such as Zodiac® inflatable boats. An example of the composition of charges and characteristics of the generator for inflating a 60-liter inflatable structure is given in the following tables.

| primary charge | Double base 1133 weight 6.45 g |
|---|---|
| Initiator | DB |
| intermediate charge | 0.40 g BNP. |
| X distance between nozzle and gate | 30 mm |
| Nozzle diameter | 2.6 mm |
| Secondary charge | Mixture 14 g NA + 2.6 g NiGu |

| Primary charge | Secondary charge | 60-L Tank under Nitrogen | | |
|---|---|---|---|---|
| Pmoy MPa | Pmoy MPa | Pmax MPa | TFP ms | Tps at Pmax ms |
| +20 | 5.5 | 2.4 | 0.33 | Not significant | 295 |

Gas generation over a period of more than 50 milliseconds can also be achieved via secondary charges alone. In this case, the chamber containing the primary charge is replaced by an energizing device as described in application WO2010103231. This type of device is particularly interesting when the secondary charge is of low mass or when the generator is in an area of the vehicle 50 that is particularly thermally stressed. For example, the impulse supply is based on the charge under 250 Volt of a 50 mF capacitor bank. It generates a current wave of a few ms with a peak value of 5000 Ampere. A second capacitor bank allows a second pulse after a desired delay. Let us add that this device allows to regulate in time the generation of gas.

With such a generator, and for the inflation of a 60-liter inflatable structure intended to protect the driver (structure consisting of a single bag), the secondary charge consists of 18 g of Riegel. The impulse supply is based on the charge under 250 Volt of a 50 mF (milli Farad) capacitor bank. It generates a current wave of a few ms with a peak value of 5,000 Ampere. A second capacitor bank allows a second pulse after a desired delay. The bag is either of the type Nylon 4.4 or of the PVC type as described above.

Gas generation over a period of more than 50 milliseconds can also be achieved via sealed 2-bags with primary charges only, especially for charges below 3 g.

Gas generation can also be achieved completely or partially with compressed gases.

Gas generators for cylinders can also be provided for the pre-tensioners of safety belts or for the activation of front/rear shock absorbers.

An example of a cylinder generator to be used to activate seat belt pre-tensioners or front/rear shock absorbers is a two-chamber generator with the following characteristics.

| primary charge | Double base 1133 weight 0.20 g |
|---|---|
| Secondary charge | Ammonium Nitrate 0.30 g |
| Combustion time | 100-250 ms |

The generator according to this example is presented as an initiator containing the 1133 grain or composite propellant and a small hermetic box outside this first component containing the NA in prills, crushed or not. Finally, the two components are assembled in the pre-tensioner cylinder head. Depending on the needs, the total charge can be increased to 1.2 g or more.

Another example of a generator that can be used for all the above-mentioned needs is a single primary chamber generator charged with homogeneous or composite propellant.

Advantageously, the oxidative charge of the propellant composite consists mainly of ADN (Ammonium DiNitramide).

Another example of a generator that can be used for all the above-mentioned needs is a generator with only one secondary chamber in which the single secondary charge consists of an oxidizing and reducing charge. The latter is activated by an energizing device.

Advantageously, the oxidizing charge contains mainly ADN (Ammonium DiNitramide).

The examples described above are presented in connection with a car. It is obvious, of course, that the disclosure-based protection system is not limited to implementation with cars. It can be applied to any other vehicle and moving components. In particular, it may be planned to equip trucks and trams on public roads with a pedestrian/bicycle protection system as described above. Similarly, motorcycles equipped with a driving assistance system may be provided, which will define and implement a protection system adapted to the given situation. For this purpose, an inflatable structure will be provided either carried directly by the driver or placed on the handlebars of the motorcycle. It may also be possible to provide an enveloping inflatable structure of the shell type carried by the motorcyclist himself/herself in the event of ejection of the latter during the shock.

The present disclosure is described above as an example. It is understood that those skilled in the art are capable of creating different alternative embodiments of the present disclosure without departing from the scope of the invention as defined by the claims.

The invention claimed is:

1. A protection system for a vehicle or a mobile component comprising:
    protective equipment equipping the vehicle or mobile component, the protective equipment comprising at least one inflatable safety structure associated with at least one gas generator that can be activated by an external control; and
    an automated system responsible for controlling critical safety functions of the vehicle or mobile component, the external control comprising an electrical signal coming from the automated system, and corresponding to predictive information of a shock of a pedestrian against the vehicle or mobile component, wherein:
        the automated system is configured to control the activation, in time, of the inflatable safety structure alone or in combination with other protective equipment of the vehicle or mobile component based on information received before and during the shock;
        the gas generator is configured to generate a gas over a period such that a total duration of inflation of the inflatable safety structure is greater than 50 milliseconds;
        the inflatable safety structure is sealed;
        the inflatable safety structure and the gas generator are disposed in a module placed in a front part of the vehicle or mobile component and are arranged so that the inflatable safety structure extends at least partially toward the front of the vehicle or mobile component; and
        the inflatable safety structure comprises at least one series of bags having a tubular shape in the deployed position, the bags of the at least one series of bags being assembled laterally and in fluid communication with each other so that inflation of the bags allows the inflatable safety structure to receive and then circle the pedestrian.

2. The protection system of claim 1, wherein the bags are assembled according to a generatrix and a distance between the bags is smaller than a diameter of the bags.

3. The protection system of claim 1, wherein the inflatable safety structure further comprises a reinforcing bag having a tubular shape in the deployed position, the reinforcing bag extending transversely to the at least one series of tubular bags at one end of the assembly.

4. The protection system of claim 3, wherein the reinforcing bag is in fluid communication with at least one of the tubular bags of the series.

5. The protection system of claim 1, wherein the inflatable safety structure comprises an additional protection bag having a tubular shape in the deployed position and extending transversely to the series of tubular bags at one end of the assembly.

6. The protection system of claim 5, wherein the additional protection bag is in fluid communication with at least one of the tubular bags of the series.

7. The protection system of claim 1, wherein the bags of the at least one series are housed in a fabric matrix.

8. The protection system of claim 1, wherein at least a portion of the bags of the series have an anisotropic thickness along a generatrix.

9. The protection system of claim 1, wherein the inflatable safety structure comprises natural or synthetic rubber, Nylon 6×6 coated with Neoprene or Silicone, or Polyurethane.

10. The protection system of claim 1, wherein the automated system is configured to control the activation of the inflatable safety structure according to predefined predictive information.

11. The protection system of claim 1, wherein the gas generator comprises homogeneous or composite propellant having a composition such that complete combustion of the propellant occurs in more than 50 milliseconds.

12. The protection system of claim 11, wherein the composite propellant has an oxidizing charge mainly composed of Ammonium DiNitramide.

13. The protection system of claim 1, wherein the gas generator is configured to generate the gas over a period such that the total duration of inflation of the inflatable safety structure is greater than 100 milliseconds.

* * * * *